(12) United States Patent
Alex et al.

(10) Patent No.: US 7,219,693 B2
(45) Date of Patent: May 22, 2007

(54) CONTAINER SHUT-OFF VALVE WITH VENTING

(75) Inventors: Peter Alex, Cloverville (CA); Ronald R. Chisholm, Truro (CA)

(73) Assignee: Scepter Corporation, Ontario (CA)

( * ) Notice: Subject to any disclaimer, the term of this patent is extended or adjusted under 35 U.S.C. 154(b) by 469 days.

(21) Appl. No.: 10/460,807

(22) Filed: Jun. 13, 2003

(65) Prior Publication Data

US 2004/0200533 A1 Oct. 14, 2004

Related U.S. Application Data (63) Continuation of application No. 10/460,807, filed on Jun. 13, 2003.

(30) Foreign Application Priority Data

Apr. 14, 2003 (CA) .................................... 2425350

(51) Int. Cl.
*F16K 24/00* (2006.01)
(52) U.S. Cl. ........................ 137/588; 137/590; 251/144
(58) Field of Classification Search ................ 137/588, 137/590; 251/144
See application file for complete search history.

(56) References Cited

U.S. PATENT DOCUMENTS 2,054,488 A * 9/1936 Sinks .......................... 222/484

(Continued)

FOREIGN PATENT DOCUMENTS

DE 54 890 C 1/1891

(Continued)

*Primary Examiner*—A. Michael Chambers
(74) *Attorney, Agent, or Firm*—McCormick, Paulding & Huber LLP (57) ABSTRACT

An apparatus for effecting transport of a liquid from a container defining an interior storage volume and having a container aperture to effect communication between the interior storage volume and an environment external to the container, the apparatus comprising a housing defining a first fluid passage and a second fluid passage and configured for mounting in a position wherein each of the first and second fluid passages is disposed in fluid communication with the interior storage volume and extends through the container aperture, the first fluid passage including a first port configured for disposition in an upper region on the interior storage volume upon the mounting of the housing to the container system, and including a second port configured for disposition in the environment external to the container upon the mounting of the housing to the container system, the second fluid passage including an inlet configured for disposition in the interior storage volume upon the mounting of the housing to the container system, and including an outlet configured for disposition in the environment external to the container upon the mounting of the housing to the container system, and a valve member configured to effect sealing of each of the first and second fluid passages, the valve member being movable relative to the housing between a closedposition, whereby each of the first and second fluid passages is sealed, and an open position, whereby each of the first and second fluid passages is at least partially open, wherein the valve member includes a first valve passageway and a second valve passageway, wherein, when the valve member is disposed in the open position, the first valve passageway registers with the first fluid passage to effect fluid communication between the first port and the second port and the second valve passageway registers with the second fluid passage to effect fluid communication between the inlet and the outlet, wherein the first fluid passage is sealed when the first valve passageway is out of registry with the first fluid passage, and the second fluid passage is sealed when the second valve passageway is out of registry with the second fluid passage, and wherein in moving from the closed position to the open position, the first valve passageway registers with the first fluid passage before the second valve passageway registers with the second fluid passage, such that the valve member is disposed in an intermediate position when the first valve passageway is registered with the first fluid passage and the second valve passageway is out of registry with the second fluid passage.

57 Claims, 4 Drawing Sheets

U.S. PATENT DOCUMENTS

| | | | |
|---|---|---|---|
| 2,066,977 A | | 1/1937 | Iler |
| 3,226,079 A | * | 12/1965 | Shaw et al. .................. 251/218 |
| 3,459,220 A | * | 8/1969 | Morse ........................ 137/605 |
| 3,570,765 A | | 3/1971 | de Gast |
| 3,675,672 A | | 7/1972 | Freeman |
| 3,677,020 A | | 7/1972 | Munselle |
| 3,747,643 A | | 7/1973 | Freeman |
| 3,783,888 A | | 1/1974 | Johnson |
| 3,836,079 A | | 9/1974 | Huston |
| 3,841,764 A | | 10/1974 | Snell et al. |
| 3,856,036 A | | 12/1974 | Drews et al. |
| 3,863,843 A | | 2/1975 | Hechler, IV |
| 3,907,205 A | | 9/1975 | Shreve |
| 3,976,227 A | | 8/1976 | Ray |
| 3,995,326 A | | 12/1976 | Umann |
| 4,022,347 A | | 5/1977 | Noble |
| 4,043,341 A | | 8/1977 | Tromovitch |
| 4,053,012 A | | 10/1977 | Farmer |
| 4,095,615 A | | 6/1978 | Ramsauer |
| 4,105,438 A | | 8/1978 | Sherwood |
| 4,112,963 A | | 9/1978 | Brubaker |
| 4,208,172 A | | 6/1980 | Dill |
| 4,232,694 A | | 11/1980 | Williams |
| 4,240,583 A | | 12/1980 | Hughes |
| 4,243,396 A | | 1/1981 | Cronenberg |
| 4,253,957 A | | 3/1981 | Sullivan |
| 4,273,166 A | | 6/1981 | Bradley |
| 4,301,826 A | | 11/1981 | Beckerer |
| 4,326,641 A | | 4/1982 | Wilken |
| 4,343,282 A | | 8/1982 | Glenn |
| 4,345,694 A | | 8/1982 | Chambers |
| 4,345,718 A | | 8/1982 | Horvath |
| 4,361,163 A | | 11/1982 | Aigo |
| 4,411,756 A | | 10/1983 | Bennett et al. |
| 4,429,809 A | | 2/1984 | Bousgarbies |
| 4,436,617 A | | 3/1984 | Moore et al. |
| 4,456,476 A | | 6/1984 | Sherwood |
| 4,462,124 A | | 7/1984 | Antos et al. |
| 4,474,111 A | | 10/1984 | Holzhauser |
| 4,485,518 A | | 12/1984 | Kasper |
| 4,489,890 A | | 12/1984 | Martin |
| 4,537,007 A | | 8/1985 | Lattanzi |
| 4,537,334 A | | 8/1985 | Spengler et al. |
| 4,595,399 A | | 6/1986 | Collins et al. |
| 4,606,477 A | | 8/1986 | Spengler et al. |
| 4,615,511 A | | 10/1986 | Sherwood |
| 4,629,098 A | | 12/1986 | Eger |
| 4,640,446 A | | 2/1987 | Walker |
| 4,683,067 A | | 7/1987 | Aleman et al. |
| 4,698,469 A | | 10/1987 | Pham et al. |
| 4,723,337 A | | 2/1988 | Ellison et al. |
| 4,724,683 A | | 2/1988 | Johnson |
| 4,781,329 A | | 11/1988 | Tenney et al. |
| 4,788,973 A | | 12/1988 | Kirchgeorg et al. |
| 4,797,206 A | | 1/1989 | Lynch |
| 4,815,505 A | | 3/1989 | Ibanez |
| 4,824,579 A | | 4/1989 | George |
| 4,829,624 A | | 5/1989 | Grzywna et al. |
| 4,839,106 A | | 6/1989 | Steiner |
| 4,840,652 A | | 6/1989 | Simon et al. |
| 4,842,643 A | | 6/1989 | van Wijk |
| 4,880,032 A | | 11/1989 | Doutt |
| 4,890,646 A | | 1/1990 | Dumser |
| 4,947,739 A | | 8/1990 | Owen |
| 4,971,248 A | | 11/1990 | Marino |
| 4,972,972 A | | 11/1990 | Goguen |
| 5,022,114 A | | 6/1991 | Kauffeldt et al. |
| 5,040,703 A | | 8/1991 | Roark et al. |
| 5,046,645 A | | 9/1991 | Hagan et al. |
| 5,052,443 A | | 10/1991 | Evangelist |
| 5,055,856 A | | 10/1991 | Tomii et al. |
| 5,075,992 A | | 12/1991 | Kahn |
| 5,098,428 A | | 3/1992 | Sandlin et al. |
| 5,143,294 A | | 9/1992 | Lintvedt |
| 5,244,021 A | | 9/1993 | Hau |
| 5,267,676 A | | 12/1993 | Lord et al. |
| 5,303,842 A | | 4/1994 | Harp et al. |
| 5,333,639 A | | 8/1994 | Nelson |
| 5,392,957 A | | 2/1995 | Parsons |
| 5,438,721 A | | 8/1995 | Pahno et al. |
| 5,472,124 A | | 12/1995 | Martushev |
| 5,540,355 A | | 7/1996 | Hancock et al. |
| 5,597,097 A | | 1/1997 | Morris |
| 5,598,955 A | | 2/1997 | Reilley |
| 5,624,059 A | | 4/1997 | Lo |
| 5,638,609 A | | 6/1997 | Chandran et al. |
| 5,638,872 A | | 6/1997 | Porter |
| 5,638,994 A | | 6/1997 | Libit et al. |
| 5,704,408 A | | 1/1998 | Law |
| 5,711,355 A | | 1/1998 | Kowalczyk |
| 5,718,260 A | | 2/1998 | Leonardi |
| 5,775,595 A | | 7/1998 | Knodel et al. |
| 5,787,722 A | | 8/1998 | Jenkins |
| 5,855,024 A | | 1/1999 | Smith |
| 6,056,028 A | | 5/2000 | Crawford |
| 6,068,163 A | | 5/2000 | Kihm |
| 6,073,811 A | | 6/2000 | Costea |
| 6,095,204 A | | 8/2000 | Healy |
| 6,189,805 B1 | | 2/2001 | West et al. |
| 6,283,137 B1 | | 9/2001 | Malecki |
| 6,287,521 B1 | | 9/2001 | Quay et al. |
| 6,289,668 B1 | | 9/2001 | Meier |
| 6,311,742 B1 | | 11/2001 | Nusen et al. |
| 6,341,628 B1 | | 1/2002 | Burson |
| 6,371,332 B1 | | 4/2002 | Fox |
| 6,412,528 B1 | | 7/2002 | Alex et al. |
| 6,616,067 B1 | | 9/2003 | Hunter |
| 6,655,426 B2 | | 12/2003 | Shevela |
| 6,823,903 B2 | | 11/2004 | Davis |
| 2001/0013381 A1 | | 8/2001 | Nagel et al. |

FOREIGN PATENT DOCUMENTS

| | | |
|---|---|---|
| DE | 374268 | 4/1923 |
| DE | 873 661 C | 4/1953 |
| GB | 2170430 A | 8/1986 |

* cited by examiner

CONTAINER SHUT-OFF VALVE WITH VENTING

CROSS-REFERENCE TO RELATED APPLICATIONS

This application is a continuation, and entitled to the benefit, of pending and allowed U.S. patent application Ser. No. 10/460,807 filed on Jun. 13, 2003, herein incorporated in its entirety. This application is related to commonly assigned and issued U.S. Pat. Nos. 6,412,528 and No. D509,559, as well as pending U.S. patent applications Ser. Nos. 10/460,415, 10/851,668, 10/851,669, 29/201,680 and 10/549,786.

FIELD OF THE INVENTION

This invention relates generally to transferring a liquid form one container to another container. In particular, it relates to an apparatus and a system for improved control of the liquid transfer.

BACKGROUND OF THE INVENTION

Liquids must often be transferred between a storage container and a temporary storage receptacle before the liquid is processed in a subsequent downstream operation. Such a temporary storage receptacle may be a gas tank on an automobile, snowmobile or a lawnmower. Known systems for effecting transfer of liquid between such containers suffer from various disadvantages. For instance, existing fluid transfer systems do not provide means for protecting dispensing devices from fluid pressure which may have developed in a storage container from which the dispensing device is configured to transfer the liquid.

SUMMARY OF THE INVENTION

The present invention provides an apparatus for effecting transport of a liquid from a container system including a container defining an interior storage volume and having a container aperture, and a cap configured for releasable mounting to the container and having a cap aperture configured for alignment with the container aperture to effect communication between the interior storage volume and an environment external to the container when the cap is releasably mounted to the container, the apparatus comprising:

a housing defining a first fluid passage and a second fluid passage, the housing configured for being pressed between the cap and the container when the cap is mounted to the container to effect mounting of the housing to the container system in a position whereby each of the first and second fluid passages is disposed in fluid communication with the interior storage volume and extends through each of the container aperture and the cap aperture for effecting fluid communication between the interior storage volume and the environment external to the container; and a valve member configured to effect sealing of each of the first and second fluid passages, the valve member being movable relative to the housing between a closed position, whereby each of the first and second fluid passages is sealed, and an open position, whereby each of the first and second fluid passages is at least partially open.

A further aspect of the invention provides an apparatus wherein the cap is threadably mounted to the container.

Another aspect of the present invention provides an apparatus wherein the housing includes a peripherally extending lip configured for being pressed between the cap and the container to effect the mounting of the housing to the container system.

A further aspect of the present invention provides the apparatus wherein the cap includes a resilient gasket for engaging the cap and the container upon the mounting of the housing to the container system.

A further aspect of the present invention provides an apparatus wherein the first fluid passage includes a first port configured for disposition in a vapour space of the interior storage volume upon the mounting of the housing to the container system.

A further aspect of the present invention provides the apparatus wherein the first fluid passage includes a first port configured for disposition in an upper region of the interior storage volume upon the mounting of the housing to the container system.

A further aspect of the present invention provides an apparatus wherein the first fluid passage includes a second port configured for disposition in the environment external to the container upon the mounting of the housing to the container system.

Another aspect of the present invention provides the apparatus wherein the second fluid passage includes an inlet configured for disposition in the interior storage volume upon the mounting of the housing to the container system.

Another aspect of the present invention provides an apparatus wherein the inlet is configured for coupling to a first flexible hose such that the first flexible hose extends into the interior storage volume upon the mounting of the housing to the container system, wherein the first flexible hose includes a hose passageway defined by an interior surface of the first flexible hose.

Another aspect of the present invention provides the apparatus wherein the inlet is defined by an inlet conduit having an exterior surface, the exterior surface including at least one peripherally extending rib for bearing against an interior surface portion of the interior surface of the first flexible hose.

A further aspect of the present invention provides an apparatus wherein the second fluid passage includes an outlet configured for disposition in the environment external to the container upon the mounting of the housing to the container system.

A further aspect of the present invention provides an apparatus wherein the outlet is configured for coupling to a second flexible hose such that the second flexible hose extends externally of the container system upon the mounting of the housing to the container system, wherein the second flexible hose includes a hose passageway defined by an interior surface of the second flexible hose.

A further aspect of the present invention provides the apparatus wherein the outlet is defined by an outlet conduit having an exterior surface, the exterior surface including at least one peripherally extending rib for bearing against an interior surface portion of the interior surface of the second flexible hose.

Another aspect of the present invention provides the apparatus further comprising an actuator coupled to the valve for effecting movement of the valve between the closed and open positions.

Another aspect of the present invention provides the apparatus wherein the actuator is configured for disposition in the environment external to the container upon the mounting of the housing to the container system.

Another aspect of the present invention provides an apparatus wherein the second fluid passage includes an outlet configured for disposition in the environment external to the container upon the mounting of the housing to the container system.

Another aspect of the present invention provides the apparatus wherein the valve member includes a first valve passageway and a second valve passageway, wherein, when the valve member is disposed in the open position, the first valve passageway registers with the first fluid passage to effect fluid communication between the first port and the second port and the second valve passageway registers with the second fluid passage to effect fluid communication between the inlet and the outlet.

Another aspect of the present invention provides the apparatus wherein the first fluid passage is sealed when the first valve passageway is out of registry with the first fluid passage, and the second fluid passage is sealed when the second valve passageway is out of registry with the second fluid passage.

A further aspect of the present invention provides the apparatus wherein in moving from the closed position to the open position, the first valve passageway registers with the first fluid passage before the second valve passageway registers with the second fluid passage, such that the valve member is disposed in an intermediate position when the first valve passageway is registering with the first fluid passage and the second valve passageway is out of registry with the second fluid passage.

Yet another aspect of the present invention provides the apparatus wherein the housing includes stop means for preventing the valve member from moving from the closed position and the open position before assuming the intermediate position.

Yet another aspect of the present invention provides the apparatus wherein the valve member is rotatably mounted within the housing for facilitating rotational movement of the valve member relative to the housing.

Another aspect of the present invention provides the apparatus wherein the valve member includes a first valve passageway and a second valve passageway, wherein, when the valve member is disposed in the open position, the first valve passageway registers with the first fluid passage to effect fluid communication between the first port and the second port, and the second valve passageway registers with the second fluid passage to effect fluid communication between the inlet and the outlet.

A further aspect of the present invention provides the apparatus wherein the first fluid passage is sealed when the first valve passageway is out of registry with the first fluid passage, and the second fluid passage is sealed when the second valve passageway is out of registry with the second fluid passage.

Another aspect of the present invention provides the apparatus wherein in moving from the closed position to the open position, the first valve passageway registers with the first fluid passage before the second valve passageway registers with the second fluid passage, such that the valve member is disposed in an intermediate position when the first valve passageway is registered with the first fluid passage and the second valve passageway is out of registry with the second fluid passage.

Another aspect of the present invention provides the apparatus wherein the housing includes stop means for preventing the valve member from moving from the closed position and to the open position before assuming the intermediate position.

Another aspect of the present invention provides the apparatus further comprising an actuator eccentrically extending from the valve member.

The present invention also provides an apparatus for effecting transport of a liquid from a container system including a container defining an interior storage volume and having a container aperture, and a cap configured for releasable mounting to the container and having a cap aperture configured for alignment with the container aperture to effect communication between the interior storage volume and an environment external to the container when the cap is releasably mounted to the container, the apparatus comprising:

a housing defining a first fluid passage and a second fluid passage;

a valve member configured to effect sealing of each of the first and second fluid passages, the valve member being movable relative to the housing between a closed position, whereby each of the first and second fluid passages is sealed, and an open position, whereby each of the first and second fluid passages is at least partially open; and a mounting collar releasably coupled to the housing, the collar configured for being pressed between the cap and the container when the cap is mounted to the container to effect mounting of the housing to the container system in a position whereby each of the first and second fluid passages is disposed in fluid communication with the interior storage volume and extends through each of the container aperture and the cap aperture for effecting fluid communication between the interior storage volume and the environment external to the container.

Another aspect of the present invention provides the apparatus wherein the mounting collar is threadably coupled to the housing.

The present invention further provides an apparatus for effecting transport of a liquid from a container defining an interior storage volume and having a container aperture to effect communication between the interior storage volume and an environment external to the container, the apparatus comprising:

a housing defining a first fluid passage and a second fluid passage and configured for mounting in a position wherein each of the first and second fluid passages is disposed in fluid communication with the interior storage volume and extends through the container aperture, the first fluid passage including a first port configured for disposition in an upper region on the interior storage volume upon the mounting of the housing to the container system, and including a second port configured for disposition in the environment external to the container upon the mounting of the housing to the container system, the second fluid passage including an inlet configured for disposition in the interior storage volume upon the mounting of the housing to the container system, and including an outlet configured for disposition in the environment external to the container upon the mounting of the housing to the container system; and a valve member configured to effect sealing of each of the first and second fluid passages, the valve member being movable relative to the housing between a closed position, whereby each of the first and second fluid passages is sealed, and an open position, whereby each of the first and second fluid passages is at least partially open, wherein the valve member includes a first valve passageway and a second valve passageway, wherein, when the valve member is disposed in the open position, the first valve passageway registers with the first fluid passage to effect fluid communication between the first port and the second port and the second valve passageway registers with the second fluid passage to effect fluid communication between the inlet and the outlet; and wherein the first fluid passage is sealed when the first valve passageway is out of registry with the first fluid passage, and the second fluid passage is sealed when the second valve passageway is out of registry with the second fluid passage, and wherein in moving from the closed position to the open position, the first valve passageway registers with the first fluid passage before the second valve passageway registers with the second fluid passage, such that the valve member is disposed in an intermediate position when the first valve passageway is registered with the first fluid passage and the second valve passageway is out of registry with the second fluid passage.

The present invention additionally provides a system for dispensing liquid comprising a container defining an interior storage volume and having a container aperture, and a cap configured for releasable mounted to the container and having a cap aperture aligned with the container aperture to effect communication between the interior storage volume and an environment external to the container;

an apparatus for effecting transport of a liquid form the container comprising:

a housing defining a first fluid passage and a second fluid passage, the housing being pressed between the cap and the container to effect mounting of the housing to the container system in a position whereby each of the first and second fluid passages is disposed in fluid communication with the interior storage volume and extends through each of the container aperture and the cap aperture for effecting fluid communication between the interior storage volume and the environment external to the container; and a valve member configured to effect sealing of each of the first and second fluid passages, the valve member being movable relative to the housing between a closed position, whereby each of the first and second fluid passages is sealed, and an open position, whereby each of the first and second fluid passages is at least partially open.

DETAILED DESCRIPTION

Figure 1:
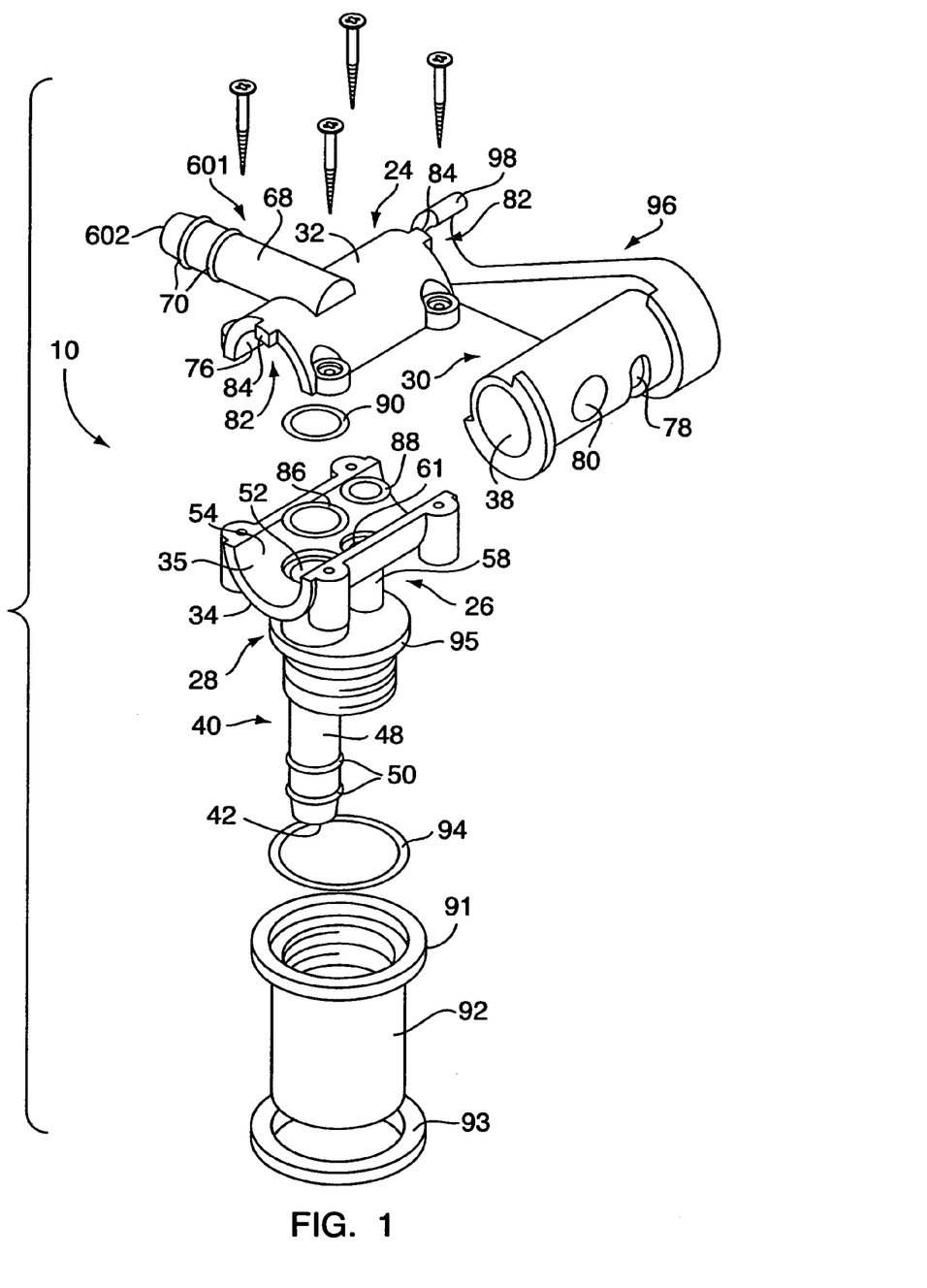
FIG. 1 is an exploded view of an embodiment of the apparatus of the present invention.
Figure 7:
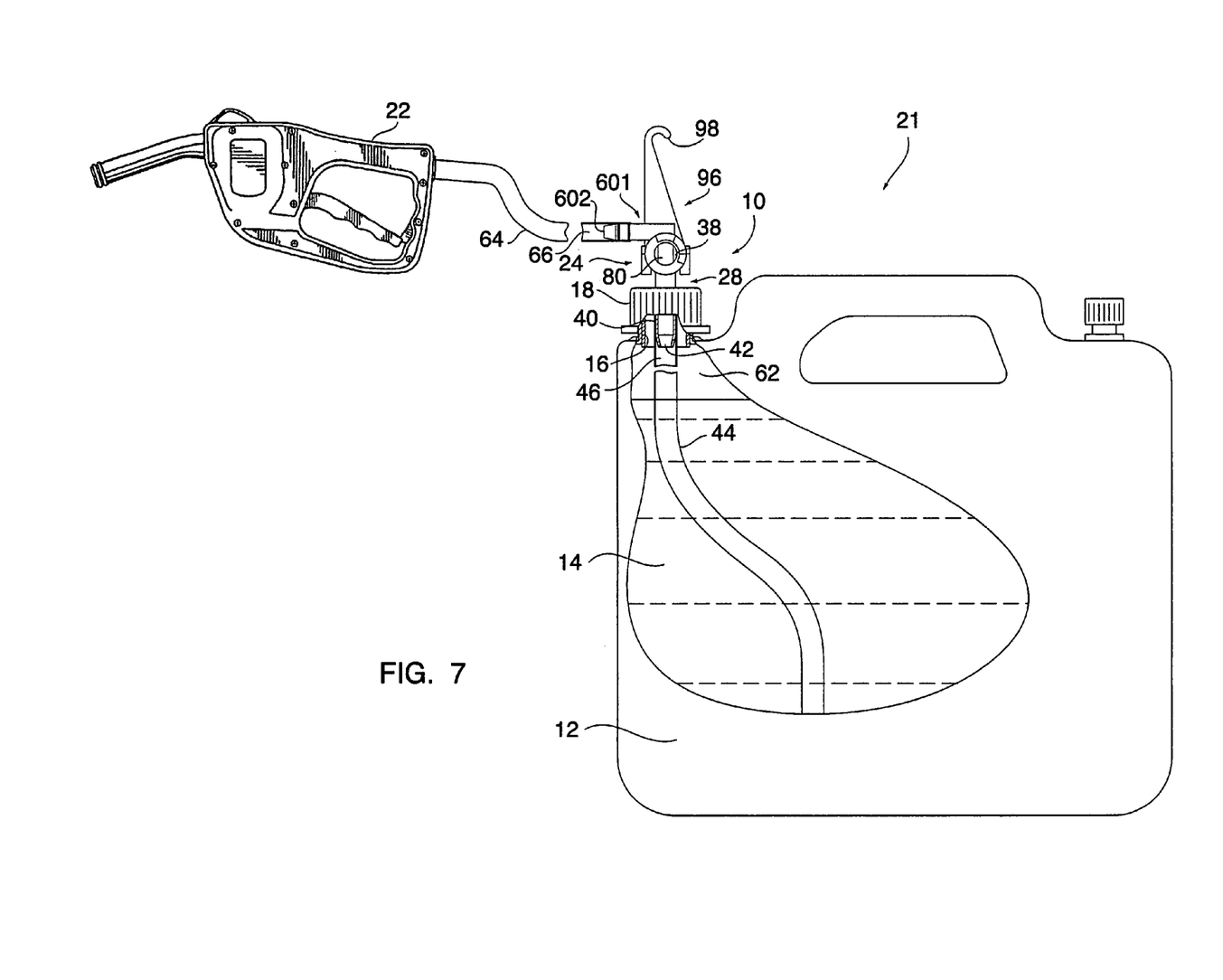
FIG. 7 is a schematic illustration of an embodiment of the system of the present invention, illustrating the apparatus being mounted to a container system and coupled to a dispensing apparatus.

Referring to FIGS. 1 and 7, the present invention provides an apparatus 10 for effecting the dispensing of a liquid from a container 12. The container 12 defines an interior storage volume 14 and includes a container aperture 16. A cap 18 is provided and configured for releasably mounting to the container 12. Preferably, the cap 18 is configured for threadably mounting to the container 12. The cap 18 includes a cap aperture 20 configured for alignment with the container aperture 16 to effect communication between the interior storage volume 14 and an environment external to the container 12 when the cap 18 is releasably mounted to the container 12. Typically, to effect sealing of the container 12, a substantially flat disc 18 is pressed between the cap and the container 12 while the cap 12 is releasably mounted to the container 12. An example of a container system 21 including a container 12 and a cap 18 is a gasoline can.

The apparatus 10 is configured for controlling fluid communication between a container 12 and a dispensing device 22. The dispensing device 22 is configured for effecting transfer of liquid from within the container to a temporary storage receptacle before the liquid is processed in the subsequent downstream operation. Such a temporary storage receptacle may be a gas tank on an automobile, snowmobile or a lawnmower. An example of a suitable dispensing device for use with the apparatus is a Flo 'N GO™, manufactured by Scotia Innovators Inc. of Truro, Nova Scotia. The Flo 'N Go™ is a dispensing device which effects dispensing by a siphoning action. A further suitable dispensing device is that described in U.S. Pat. No. 6,412,528. The present apparatus 10 can be used with other siphon-type dispensing devices, or with dispensing devices which rely upon gravity flow.

Figure 2:
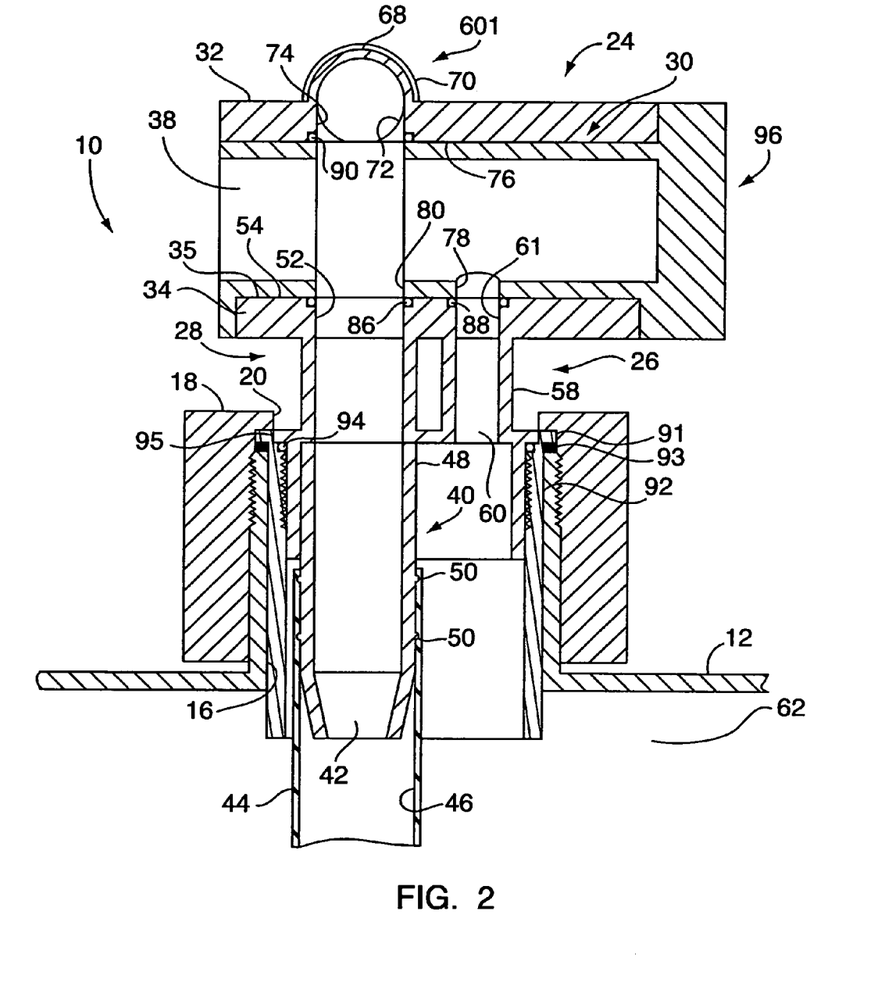
FIG. 2 is a sectional elevation drawing of an embodiment of the apparatus of the present invention, illustrating the apparatus mounted between a cap and container.
Figure 3:
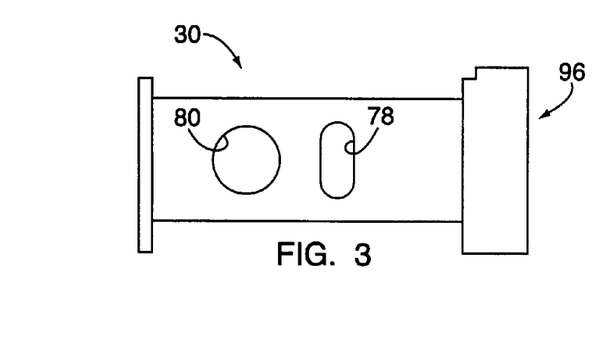
FIG. 3 is a side elevation view of the first side of the valve member and actuator of an embodiment of the apparatus of the present invention.
Figure 4:
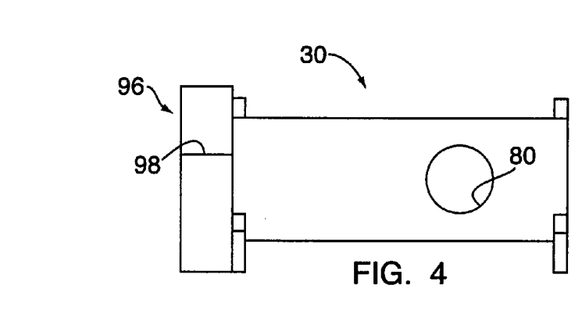
FIG. 4 is a side elevation view of the second side of the valve member and actuator of an embodiment of the apparatus of the present invention.
Figure 5:
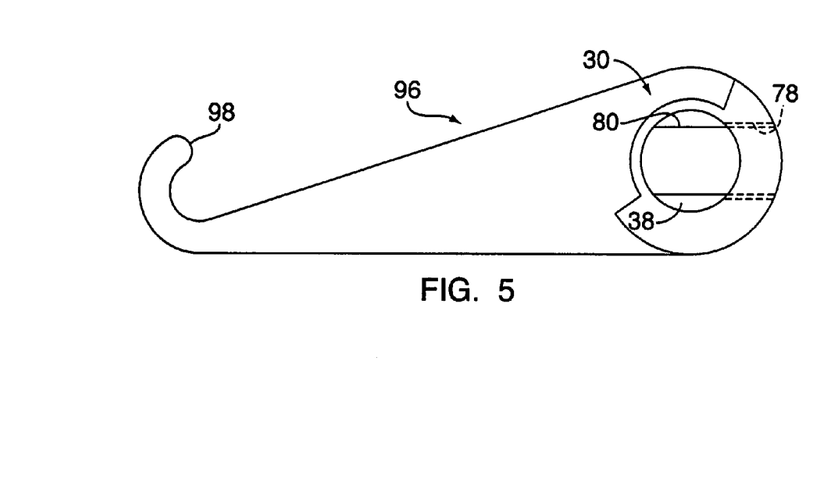
FIG. 5 is a front elevation view of the valve and actuator as illustrated in FIGS. 3 and 4.

The apparatus 10 includes a housing 24, defining a first fluid passage 26 and a second fluid passage 28, and a valve member 30 configured to effect sealing of each of the first and second fluid passages 26, 28. Preferably, the housing 24 and the valve member 30 are constructed of high density polyethylene. Referring to FIG. 2, the housing 24 is configured for being pressed between the cap 18 and the container 12 of the container system when the cap 18 is mounted to the container 12. When pressed between the cap 18 and the container 12, the housing 24 is mounted to the container system 21 in a position whereby each of the first and second fluid passages 26, 28 is disposed in fluid communication with the interior storage volume 14 and extends through each of the container aperture 16 and the cap aperture 20 for effecting fluid communication between the interior storage volume 14 and the environment external to the container 12.

The housing 24 includes an upper body portion 32 and a lower body portion 34. The lower body portion 34 is mounted to the upper body portion 32 with a plurality of screws to define a cavity 35 which receives the valve member 30 as well as defines a second port 38 for effecting venting as described below.

The lower body portion 34 includes an inlet barb 40, defining an inlet 42, and configured for disposition in the interior storage volume 14 upon the mounting of the housing 24 to the container system 21. The inlet barb 40 is configured for coupling to a first flexible hose 44 such that the first flexible hose 44 extends into the interior storage volume 14 below the liquid level in the container 12, upon the mounting of the housing 24 to a container system 21 having a liquid-filled container 12. The first flexible hose 44 includes a fluid passageway 46 defined by an interior surface of the first flexible hose 44. The inlet barb 40 is defined by an inlet conduit 48 having an exterior surface, the exterior surface including at least one peripherally extending rib 50 for bearing against an interior surface portion of the interior surface of the first flexible hose 44. The inlet 42 of the inlet barb 40 communicates with an aperture 52 formed in the interior surface 54 of the lower body portion 34, via a fluid passage, for effecting flow of liquid from within the interior storage volume 14 to the aperture 52.

The lower body portion 34 also includes a vent passage 58 including a first port 60 configured for disposition in an upper region 62 of the interior storage volume 14 of the container 12 upon the mounting of the housing 24 to the container system 21. Typically, the upper region 62 of the interior storage volume 14 defines a vapour space of the container 12. The first port 60 communicates with an aperture 61 formed in the interior surface 54 of the lower body portion 34 via the vent passage 58. In this respect, the vent passage 58 facilitates venting of the container 12 to the environment exterior to the container 12 through the second port 38 formed in the housing 24, and thereby define the first fluid passage 26.

Figure 6:
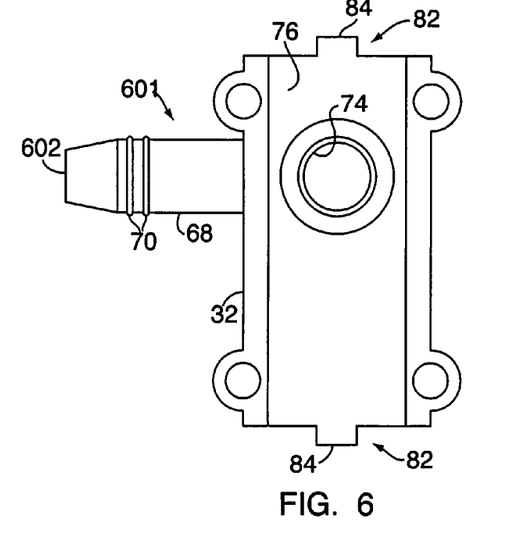
FIG. 6 is a plan view taken from the interior side of the upper body portion of an embodiment of the apparatus of the present invention.

The upper body portion 32 includes an outlet barb 601 defining an outlet 602 for discharging liquid from within the interior storage 14 volume of the container 12. The outlet 602 is configured for disposition in the environment external to the container 12 upon the mounting of the housing 24 to the container system 21. The outlet 602 is configured for coupling to a second flexible hose 64. The second flexible hose 64 facilitates coupling to the dispensing device 22. The second flexible hose 64 includes a hose passageway 66 defined by an interior surface of the second flexible hose 64. The outlet barb 601 is defined by an outlet conduit 68 having an exterior surface, the exterior surface including at least one peripherally extending rib 70 for bearing against an interior surface portion of the interior surface of the second flexible hose 64. A fluid passage 72 extends within the outlet barb 601 from the outlet 602 to an aperture 74 formed in the interior surface 76 of the upper body portion 32 (see FIG. 6). Together with the fluid passage 56, the fluid passage 72 defines the second fluid passage 28 of the housing 24.

Rotatably mounted between the upper and lower body portions 32, 34 is the valve member 30. Referring to FIGS. 1–5, the valve member 30 is movable relative to the housing 24 between a closed position, whereby each of the first and second fluid passages 26, 28 are sealed, and an open position whereby each of the first and second fluid passages 26, 28 is at least partially open. The valve member 30 includes a first valve passageway 78 and a second valve passageway 80.

When the valve member 30 is disposed in the open position, the first valve passageway 78 registers with the aperture 61 of the lower body portion 34 and the second port 38. In this respect, it is said that the first valve passageway 78 registers with the first fluid passage 26 to effect fluid communication between the first port 60 and the second port 58. Simultaneously, the second valve passageway 80 registers with the apertures 74, 52 of the upper and lower body portions 32, 34. In this respect, it is said that the second valve passageway 80 registers with the second fluid passage 28 to effect fluid communication between the inlet 42 and the outlet 602. The passageways 78, 80 are said to be registered so long as some fluid communication is effected.

On the other hand, when the valve member 30 is disposed in the closed position, the first fluid passage 26 is set to be sealed when the first valve passageway 78 is out of registry with the aperture 61. In this respect, it is said that the first valve passageway 78 is out of registry with the first fluid passage 26. Simultaneously, the second valve passageway 80 is out of registry with the apertures 74, 52. In this respect, it is said that the second valve passageway 80 is out of registry with the second fluid passage 28.

In moving from the closed position to the open position, the first valve passageway 78 registers with the first fluid passage 26 before the second valve passageway 80 registers with the second fluid passage 28. In this respect, the valve member 30 is said to be disposed in an intermediate position when the first valve passageway 78 is registering with the first fluid passage 26 and the second valve passageway 80 is out of registry with the second fluid passage 28. The leading edge of the aperture 61 becomes registered with the first valve passageway 78 before the leading edge of the aperture 52 becomes registered with the second valve passageway 80. As a result, venting of the vapour space of the container 12 proceeds before fluid communication is effected between the liquid in the container 12 and the dispensing device 22 via the second fluid passage 28. This effects depressurization of the system before the second valve passageway 80 becomes registered with the aperture. In this respect, this mitigates pressurization of the dispensing device 22 once the dispensing device 22 becomes fluidly coupled to the container 12.

The housing 24 includes stop means 82 for preventing the valve member 30 from moving from the closed position to the open position before assuming the intermediate position. In this respect, the housing 24 includes a travel stop 84 for limiting rotation of the valve member 30. The valve member 30 becomes engaged to the stop travel 84 upon assuming the open condition, and thereby is prevented from moving to the closed position unless the valve member 30 first assumes past the intermediate position. Similarly, when the valve member 30 assumes the closed position, the valve member is engaged to the travel stop 84, and thereby is prevented from moving to the open position unless the valve member 30 assumes the intermediate position.

To effect sealing engagement between the valve member 30 and the housing 24, sealing members 86, 88, 90, such as O-rings, are provided in grooves formed about each of the apertures 52, 61, 74 of the upper and lower body portions.

The housing 24 further includes a mounting collar 92 releasably coupled to the lower body portion 34. The mounting collar includes a lip 91 having a gasket 93 for effecting mounting of the housing 24 to the container system 21. A collar sealing member 94, such as and O-ring, is captured between the mounting collar 92 and the lower body portion 34. The collar sealing member 94 provides a seal between the mounting collar 92 and the lower body portion 34 to prevent fluid escaping from the container 12. The collar 92, and particularly the gasket 93, is configured for being pressed between the cap 18 and the container 12 when the cap 18 is mounted to the container 12 to effect mounting of the housing 24 to the container system 21 in a position whereby each of the first and second fluid passages 26, 28 is disposed in fluid communication with the interior storage volume 14 and extends through each of the container aperture 16 and the cap aperture 20 for effecting fluid communication between the interior storage volume 14 and the environment external to the container.

Referring to FIG. 2, to effect mounting of the housing 12 to the container system 21, the assembled upper and lower body portions 32, 34, without the mounting collar 92, are inserted through the cap aperture 20 of the cap 18. The mounting collar 92 is then threaded onto the lower body portion 34 until the mounting collar 92 contacts a lip 95 provided on the lower body portion 34. Such engagement between the mounting collar 92 and the lower body portion 34 occurs simultaneously with the compression of the collar sealing member 94. This assembly is then inserted through the container aperture 16. The mounting collar 92 is configured such that it is supported on the container 12. The cap 18 is then threaded onto the container 12, thereby pressing the gasket 93 of the mounting collar 92 between the container 12 and the cap 18, thereby effecting mounting of the housing to the container system 21.

An actuator 96 eccentrically extends from the valve member 30 to effect rotational movement of the valve member 30 within the housing 24. In one embodiment, the valve member 30 is fitted within the housing 24 such that rotational movement of the valve member is permitted in response to sufficient force applied to the actuator 96, while sufficient frictional resistance is realized between the valve member 30 and the housing 24 to enable the valve member 30 to retain its position once the force being applied to the actuator is removed.

In one embodiment, the actuator 96 includes a storage hook 98 to facilitate storage of the dispensing device 22 by hanging the dispensing device by the hook 98.

Each of the O-rings 86, 88, 90, and 94 and gasket 93 is made from sufficiently resilient and inert material, such as Buna-N or VITON™.

The operation of the apparatus 10 will now be described. In the closed position, the valve member 30 is positioned such that the first and second fluid passageways 26, 28 are not registered with corresponding apertures 61, 52 provided in the lower body portions 34. By applying force to the actuator 96, the valve member 30 is moved to the intermediate position. In the intermediate position, the leading edge of the first valve passageway 78 registers with the aperture 61 to effect venting of the vapour space in the container 12 through the first fluid passage 26. Such venting facilitates depressurization of the fluid in the container 12. Upon sufficient depressurization, a force can be further applied to the actuator 96 to move the valve member 30 to the open position. In the open position, the first and second fluid passageways 78 are registered with the aperture 61 of the lower body portion 34. In this respect, the interior storage volume 14 of the container 12 is fluidly coupled to the atmosphere to facilitate dispensing. Simultaneously, when the valve member 30 is in the open position, the second fluid passageway 80 is registered with the aperture 52 of the lower body portion 34 and the aperture of the upper body portion 32. In this respect, the dispensing device 22 is fluidly coupled with the liquid contained in the container 12, thereby facilitating dispensing of the liquid.

In one embodiment, the valve member 30 is biased towards the closed position by a resilient member, such as a spring. In this respect, once the force moving the valve member 30 to the open position is removed, the valve member 30 returns to the closed position automatically.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. An apparatus for effecting transport of a liquid from a container system including a container defining an interior storage volume and having a container aperture, and a cap configured for releasable mounting to the container and having a cap aperture configured for alignment with the container aperture to effect communication between the interior storage volume and an environment external to the container when the cap is releasably mounted to the container, the apparatus comprising:

a housing defining a first fluid passage and a second fluid passage, the housing configured for being pressed between the cap and the container when the cap is mounted to the container to effect mounting of the housing to the container system in a position whereby each of the first and second fluid passages is disposed in fluid communication with the interior storage volume and extends through each of the container aperture and the cap aperture for effecting fluid communication between the interior storage volume and the environment external to the container; and a valve member configured to effect sealing of each of the first and second fluid passages, the valve member being movable relative to the housing between a closed position, whereby each of the first and second fluid passages is sealed, and an open position, whereby each of the first and second fluid passages is at least partially open.

2. An apparatus as claimed in claim 1, wherein the cap is threadably mounted to the container.

3. An apparatus as claimed in claim 2, wherein the housing includes a peripherally extending lip configured for being pressed between the cap and the container to effect the mounting of the housing to the container system.

4. The apparatus as claimed in claim 3, wherein the cap includes a resilient gasket for engaging the cap and the container upon the mounting of the housing to the container system.

5. An apparatus as claimed in claim 4, wherein the first fluid passage includes a first port configured for disposition in a vapour space of the interior storage volume upon the mounting of the housing to the container system.

6. The apparatus as claimed in claim 4, wherein the first fluid passage includes a first port configured for disposition in an upper region of the interior storage volume upon the mounting of the housing to the container system.

7. An apparatus as claimed in any of claim 5 or 6, wherein the first fluid passage includes a second port configured for disposition in the environment external to the container upon the mounting of the housing to the container system.

8. The apparatus as claimed in claim 7, wherein the second fluid passage includes an inlet configured for disposition in the interior storage volume upon the mounting of the housing to the container system.

9. An apparatus as claimed in claim 8, wherein the inlet is configured for coupling to a first flexible hose such that the first flexible hose extends into the interior storage volume upon the mounting of the housing to the container system, wherein the first flexible hose includes a hose passageway defined by an interior surface of the first flexible hose.

10. The apparatus as claimed in claim 9, wherein the inlet is defined by an inlet conduit having an exterior surface, the exterior surface including at least one peripherally extending rib for bearing against an interior surface portion of the interior surface of the first flexible hose.

11. An apparatus as claimed in claim 10, wherein the second fluid passage includes an outlet configured for disposition in the environment external to the container upon the mounting of the housing to the container system.

12. An apparatus as claimed in claim 11, wherein the outlet is configured for coupling to a second flexible hose such that the second flexible hose extends externally of the container system upon the mounting of the housing to the container system, wherein the second flexible hose includes a hose passageway defined by an interior surface of the second flexible hose.

13. The apparatus as claimed in claim 12, wherein the outlet is defined by an outlet conduit having an exterior surface, the exterior surface including at least one peripherally extending rib for bearing against an interior surface portion of the interior surface of the second flexible hose.

14. The apparatus as claimed in claim 13, further comprising an actuator coupled to the valve member for effecting movement of the valve member between the closed and open positions.

15. The apparatus as claimed in claim 14, wherein the actuator is configured for disposition in the environment external to the container upon the mounting of the housing to the container system.

16. An apparatus as claimed in claim 8, wherein the second fluid passage includes an outlet configured for disposition in the environment external to the container upon the mounting of the housing to the container system.

17. The apparatus as claimed in claim 16, wherein the valve member includes a first valve passageway and a second valve passageway, wherein, when the valve member is disposed in the open position, the first valve passageway registers with the first fluid passage to effect fluid communication between the first port and the second port and the second valve passageway registers with the second fluid passage to effect fluid communication between the inlet and the outlet.

18. The apparatus as claimed in claim 17, wherein the first fluid passage is sealed when the first valve passageway is out of registry with the first fluid passage, and the second fluid passage is sealed when the second valve passageway is out of registry with the second fluid passage.

19. The apparatus as claimed in claim 18, wherein in moving from the closed position to the open position, the first valve passageway registers with the first fluid passage before the second valve passageway registers with the second fluid passage, such that the valve member is disposed in an intermediate position when the first valve passageway is registering with the first fluid passage and the second valve passageway is out of registry with the second fluid passage.

20. The apparatus as claimed in claim 19, wherein the housing includes stop means for preventing the valve member from moving from the closed position and the open position before assuming the intermediate position.

21. The apparatus as claimed in claim 16, wherein the valve member is rotatably mounted within the housing for facilitating rotational movement of the valve member relative to the housing.

22. The apparatus as claimed in claim 21, wherein the valve member includes a first valve passageway and a second valve passageway, wherein, when the valve member is disposed in the open position, the first valve passageway registers with the first fluid passage to effect fluid communication between the first port and the second port, and the second valve passageway registers with the second fluid passage to effect fluid communication between the inlet and the outlet.

23. The apparatus as claimed in claim 22, wherein the first fluid passage is sealed when the first valve passageway is out of registry with the first fluid passage, and the second fluid passage is sealed when the second valve passageway is out of registry with the second fluid passage.

24. The apparatus as claimed in claim 23, wherein in moving from the closed position to the open position, the first valve passageway registers with the first fluid passage before the second valve passageway registers with the second fluid passage, such that the valve member is disposed in an intermediate position when the first valve passageway is registered with the first fluid passage and the second valve passageway is out of registry with the second fluid passage.

25. The apparatus as claimed in claim 24, wherein the housing includes stop means for preventing the valve member from moving from the closed position and to the open position before assuming the intermediate position.

26. The apparatus as claimed in claim 25, further comprising an actuator eccentrically extending from the valve member.

27. An apparatus for effecting transport of a liquid from a container system including a container defining an interior storage volume and having a container aperture, and a cap configured for releasable mounting to the container and having a cap aperture configured for alignment with the container aperture to effect communication between the interior storage volume and an environment external to the container when the cap is releasably mounted to the container, the apparatus comprising:
  a housing defining a first fluid passage and a second fluid passage;
  a valve member configured to effect sealing of each of the first and second fluid passages, the valve member being movable relative to the housing between a closed position, whereby each of the first and second fluid passages is sealed, and an open position, whereby each of the first and second fluid passages is at least partially open; and
  a mounting collar releasably coupled to the housing, the mounting collar configured for being pressed between the cap and the container when the cap is mounted to the container to effect mounting of the housing to the container system in a position whereby each of the first and second fluid passages is disposed in fluid communication with the interior storage volume and extends through each of the container aperture and the cap aperture for effecting fluid communication between the interior storage volume and the environment external to the container.

28. The apparatus as claimed in claim 27, wherein the mounting collar is threadably coupled to the housing.

29. An apparatus for effecting transport of a liquid from a container defining an interior storage volume and having a container aperture to effect communication between the interior storage volume and an environment external to the container, the apparatus comprising:
  a housing defining a first fluid passage and a second fluid passage and configured for mounting in a position wherein each of the first and second fluid passages is disposed in fluid communication with the interior storage volume and extends through the container aperture, the first fluid passage including a first port configured for disposition in an upper region on the interior storage volume upon the mounting of the housing to the container system, and including a second port configured for disposition in the environment external to the container upon the mounting of the housing to the container system, the second fluid passage including an inlet configured for disposition in the interior storage volume upon the mounting of the housing to the container system, and including an outlet configured for disposition in the environment external to the container upon the mounting of the housing to the container system; and a valve member configured to effect sealing of each of the first and second fluid passages, the valve member being movable relative to the housing between a closed position, whereby each of the first and second fluid passages is sealed, and an open position, whereby each of the first and second fluid passages is at least partially open, wherein the valve member includes a first valve passageway and a second valve passageway, wherein, when the valve member is disposed in the open position, the first valve passageway registers with the first fluid passage to effect fluid communication between the first port and the second port and the second valve passageway registers with the second fluid passage to effect fluid communication between the inlet and the outlet;

wherein the first fluid passage is sealed when the first valve passageway is out of registry with the first fluid passage, and the second fluid passage is sealed when the second valve passageway is out of registry with the second fluid passage, and wherein in moving from the closed position to the open position, the first valve passageway registers with the first fluid passage before the second valve passageway registers with the second fluid passage, such that the valve member is disposed in an intermediate position when the first valve passageway is registered with the first fluid passage and the second valve passageway is out of registry with the second fluid passage.

30. The apparatus as claimed in claim 29, wherein the housing includes stop means for preventing the valve member from moving from the closed position and to the open position before assuming the intermediate position.

31. The apparatus as claimed in claim 30, wherein the valve member is rotatably mounted within the housing for facilitating rotational movement of the valve member relative to the housing.

32. A system for dispensing liquid comprising:
a container defining an interior storage volume and having a container aperture, and a cap configured for releasable mounted to the container and having a cap aperture aligned with the container aperture to effect communication between the interior storage volume and an environment external to the container;
an apparatus for effecting transport of a liquid from the container comprising:
a housing defining a first fluid passage and a second fluid passage, the housing being pressed between the cap and the container to effect mounting of the housing to the container system in a position whereby each of the first and second fluid passages is disposed in fluid communication with the interior storage volume and extends through each of the container aperture and the cap aperture for effecting fluid communication between the interior storage volume and the environment external to the container; and
a valve member configured to effect sealing of each of the first and second fluid passages, the valve member being movable relative to the housing between a closed position, whereby each of the first and second fluid passages is sealed, and an open position, whereby each of the first and second fluid passages is at least partially open.

33. An apparatus as claimed in claim 32, wherein the cap is threadably mounted to the container.

34. An apparatus as claimed in claim 33, wherein the housing includes a peripherally extending lip configured for being pressed between the cap and the container to effect the mounting of the housing to the container system.

35. The apparatus as claimed in claim 34, wherein the cap includes a resilient gasket for engaging the cap and the container upon the mounting of the housing to the container system.

36. An apparatus as claimed in claim 35, wherein the first fluid passage includes a first port configured for disposition in a vapour space of the interior storage volume upon the mounting of the housing to the container system.

37. The apparatus as claimed in claim 36, wherein the first fluid passage includes a first port configured for disposition in an upper region of the interior storage volume upon the mounting of the housing to the container system.

38. An apparatus as claimed in any of claim 36 or 37, wherein the first fluid passage includes a second port configured for disposition in the environment external to the container upon the mounting of the housing to the container system.

39. The apparatus as claimed in claim 38, wherein the second fluid passage includes an inlet configured for disposition in the interior storage volume upon the mounting of the housing to the container system.

40. An apparatus as claimed in claim 39, wherein the inlet is configured for coupling to a first flexible hose such that the first flexible hose extends into the interior storage volume upon the mounting of the housing to the container system, wherein the first flexible hose includes a hose passageway defined by an interior surface of the first flexible hose.

41. The apparatus as claimed in claim 40, wherein the inlet is defined by an inlet conduit having an exterior surface, the exterior surface including at least one peripherally extending rib for bearing against an interior surface portion of the interior surface of the first flexible hose.

42. An apparatus as claimed in claim 41, wherein the second fluid passage includes an outlet configured for disposition in the environment external to the container upon the mounting of the housing to the container system.

43. An apparatus as claimed in claim 42, wherein the outlet is configured for coupling to a second flexible hose such that the second flexible hose extends externally of the container system upon the mounting of the housing to the container system, wherein the second flexible hose includes a hose passageway defined by an interior surface of the second flexible hose.

44. The apparatus as claimed in claim 43, wherein the outlet is defined by an outlet conduit having an exterior surface, the exterior surface including at least one peripherally extending rib for bearing against an interior surface portion of the interior surface of the second flexible hose.

45. The apparatus as claimed in claim 44, further comprising an actuator coupled to the valve member for effecting movement of the valve member between the closed and open positions.

46. The apparatus as claimed in claim 45, wherein the actuator is configured for disposition in the environment external to the container upon the mounting of the housing to the container system.

47. An apparatus as claimed in claim 39, wherein the second fluid passage includes an outlet configured for disposition in the environment external to the container upon the mounting of the housing to the container system.

48. The apparatus as claimed in claim 47, wherein the valve member includes a first valve passageway and a second valve passageway, wherein, when the valve member is disposed in the open position, the first valve passageway registers with the first fluid passage to effect fluid communication between the first port and the second port and the second valve passageway registers with the second fluid passage to effect fluid communication between the inlet and the outlet.

49. The apparatus as claimed in claim 48, wherein the first fluid passage is sealed when the first valve passageway is out of registry with the first fluid passage, and the second fluid passage is sealed when the second valve passageway is out of registry with the second fluid passage.

50. The apparatus as claimed in claim 49, wherein in moving from the closed position to the open position, the first valve passageway registers with the first fluid passage before the second valve passageway registers with the second fluid passage, such that the valve member is disposed in an intermediate position when the first valve passageway is registering with the first fluid passage and the second valve passageway is out of registry with the second fluid passage.

51. The apparatus as claimed in claim 50, wherein the housing includes stop means for preventing the valve member from moving from the closed position and the open position before assuming the intermediate position.

52. The apparatus as claimed in claim 47, wherein the valve member is rotatably mounted within the housing for facilitating rotational movement of the valve member relative to the housing.

53. The apparatus as claimed in claim 52, wherein the valve member includes a first valve passageway and a second valve passageway, wherein, when the valve member is disposed in the open position, the first valve passageway registers with the first fluid passage to effect fluid communication between the first port and the second port, and the second valve passageway registers with the second fluid passage to effect fluid communication between the inlet and the outlet.

54. The apparatus as claimed in claim 53, wherein the first fluid passage is sealed when the first valve passageway is out of registry with the first fluid passage, and the second fluid passage is sealed when the second valve passageway is out of registry with the second fluid passage.

55. The apparatus as claimed in claim 54, wherein in moving from the closed position to the open position, the first valve passageway registers with the first fluid passage before the second valve passageway registers with the second fluid passage, such that the valve member is disposed in an intermediate position when the first valve passageway is registered with the first fluid passage and the second valve passageway is out of registry with the second fluid passage.

56. The apparatus as claimed in claim 55, wherein the housing includes stop means for preventing the valve member from moving from the closed position and to the open position before assuming the intermediate position.

57. The apparatus as claimed in claim 56, further comprising an actuator eccentrically extending from the valve member.

\* \* \* \* \*